United States Patent [19]
Orlowski et al.

[11] Patent Number: 5,150,123
[45] Date of Patent: Sep. 22, 1992

[54] FIELD DISTURBANCE MONITOR SYSTEM

[75] Inventors: David P. Orlowski, Clinton; Larry Eccleston, Marshall; Earl R. Goodrich, II, East Lansing, all of Mich.

[73] Assignee: Microwave Sensors, Ann Arbor, Mich.

[21] Appl. No.: 703,178

[22] Filed: May 20, 1991

[51] Int. Cl.⁵ .............................................. G01S 9/42
[52] U.S. Cl. ................................................... 342/28
[58] Field of Search ......................................... 342/28

[56] References Cited

U.S. PATENT DOCUMENTS

| | | |
|---|---|---|
| 3,727,721 | 4/1973 | Lee et al. . |
| 3,957,322 | 5/1976 | Mastronardi et al. . |
| 3,957,323 | 5/1976 | Tucker et al. . |
| 4,033,649 | 7/1977 | Naito et al. . |
| 4,210,912 | 7/1980 | Naidich et al. ............... 342/28 X |
| 4,256,355 | 3/1981 | Yamaguchi et al. . |
| 4,286,260 | 8/1981 | Gershberg et al. ............ 342/28 X |
| 4,307,922 | 12/1981 | Rhodes, Jr. . |
| 4,412,772 | 11/1983 | Naito et al. . |
| 4,422,816 | 12/1983 | Naito et al. . |
| 4,437,711 | 3/1984 | Dahnert . |
| 4,456,911 | 6/1984 | Augustine . |
| 4,733,923 | 3/1988 | Dahnert . |
| 4,744,307 | 5/1988 | Peterman et al. . |
| 4,745,516 | 5/1988 | Griffin . |
| 4,783,618 | 11/1988 | Artrip . |
| 4,970,517 | 11/1990 | Williams ............................. 342/28 |

OTHER PUBLICATIONS

Microwave Sensors Product Brochure.

Primary Examiner—Mark Hellner
Attorney, Agent, or Firm—Harness, Dickey & Pierce

[57] ABSTRACT

A field disturbance monitor system which senses changes in a reflected signal caused by animate objects compared to inanimate objects in the same zone. The system employs a microprocessor which controls the system. A transmitter transmits a pulses microwave signal in response to a control signal from the microprocessor. A receiver receives a return signal which represents a reflection of the transmitted signal. A sample and hold circuit senses and holds the magnitude of the pulsed signal. Analog to digital conversion is obtained, whereby a ramp generator generates a ramp voltage which is compared with the magnitude of the received signal by a comparator. The microprocessor measures the time it takes the ramp voltage to rise to the magnitude of the detected signal. The microprocessor continuously computes a recursive short term average and compares this average value with a recursive long-term average. Deviations between the two time periods are the result of a disturbance within the monitoring field. Furthermore, the system is continuously self-adjusted to allow the conversion process to occur within the bounds of the measurement circuit, by changing the gain applied to the detected signal.

12 Claims, 10 Drawing Sheets

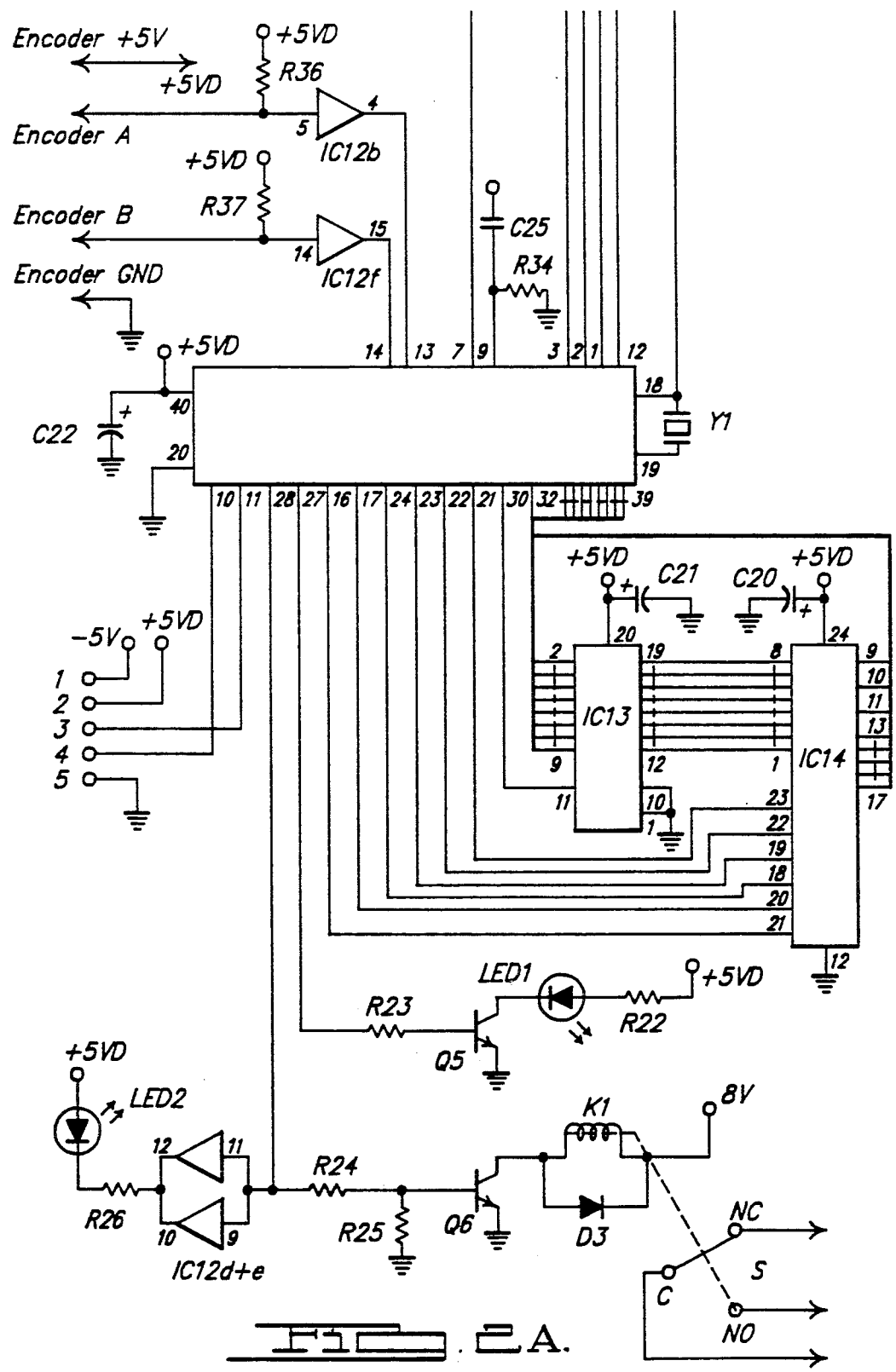

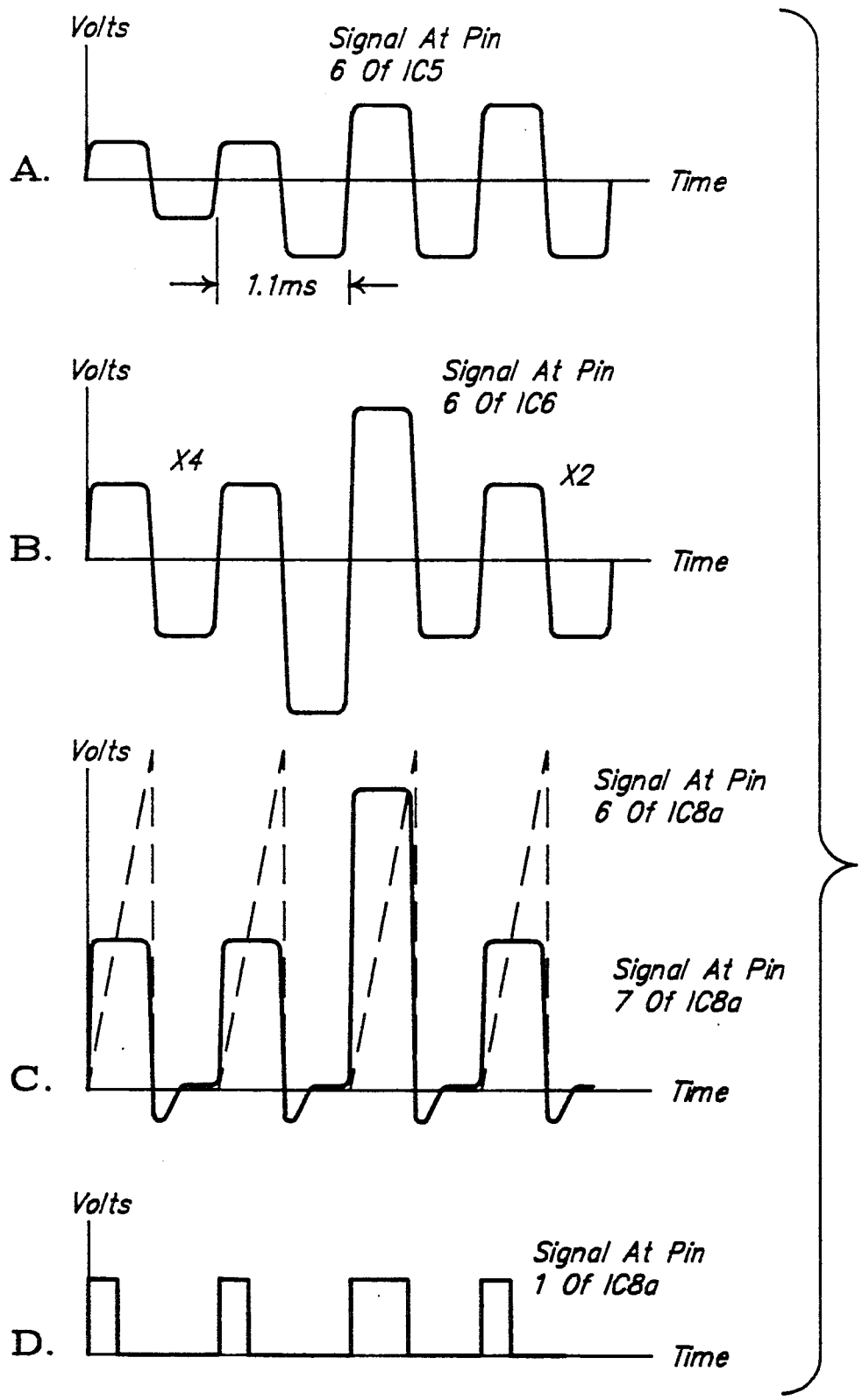

FIELD DISTURBANCE MONITOR SYSTEM

BACKGROUND OF THE INVENTION

Related Application

Application Ser. No. 07/703,188, entitled MOVABLE STORAGE SYSTEM WITH AISLE MONITORING APPARATUS, filed concurrently herewith describes an application of the detection system disclosed herein. The disclosure of said application Ser. No. 07/703,188 is hereby incorporated herein by reference.

TECHNICAL FIELD

The present invention relates to presence sensors and more specifically to a microwave field disturbance monitor system.

DISCUSSION

The present invention is particularly suited for detecting relatively slight movement in a three-dimensional field. One example of such an application is a mobile shelving system such as the system disclosed in the aforementioned related application Ser. No. 07/703,188. Typically, these systems employ many shelves which ride on metal tracks arranged perpendicularly to the shelves. The shelves are normally in a collapsed configuration, so that only one aisle is available for accessing books at any given time. Associated with each shelf is a drive motor for moving designated shelves so as to effectively move the aisle. Such systems offer more storage capacity for a given space than permanently mounted conventional bookshelves.

In such an application, it would be desirable to provide an automatic monitor system which is sensitive enough to recognize slight movement, such as breathing, of a motionless person. Such a monitor system could be used to help avoid improper operation of the shelving system.

SUMMARY OF THE INVENTION

In accordance with the teachings of the present invention, a field disturbance monitor system is provided. A microprocessor controls the system and determines whether a moving object is present. A timer derived from the microprocessor causes a transmitter to transmit a pulsed microwave signal. A receiver detects the reflected signal. A sample and hold circuit senses and holds the magnitude of the return or reflected signal. A ramp generator produces a linear voltage ramp signal. A comparator compares the voltage ramp signal to the magnitude of the return signal. Using an internal timer based on the microprocessor clock, the microprocessor measures the time required for the voltage ramp to go from zero to the sample voltage. The microprocessor thereby converts the return signal amplitude to a digital number proportional to the return signal. Since the transmitter is pulsed repetitively at a preset frequency the microprocessor receives a continuous succession of samples. It subjects these samples to two recursive averaging processes. The first is a short term recursive average to filter out any random noise in the system. The second is a longer term recursive average to establish a reference. If the short term average deviates from the long term average by more than a certain number, the microprocessor interprets the deviation as motion in the protected zone. In addition, the microprocessor controls a digital gain circuit which is applied to the detected return signal to keep the magnitude of the sampled signal within the mid-range of the measurement circuit.

An important feature of the present invention is its ability to discriminate very slight movements, such as the breathing of an otherwise immobile person.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings:

FIG. 2a is a schematic diagram of the field disturbance monitor system;

FIG. 3 is a timing diagram illustrating a reflected signal from animate objects;

DETAILED DESCRIPTION OF THE PREFERRED EMBODIMENT

Figure 1:
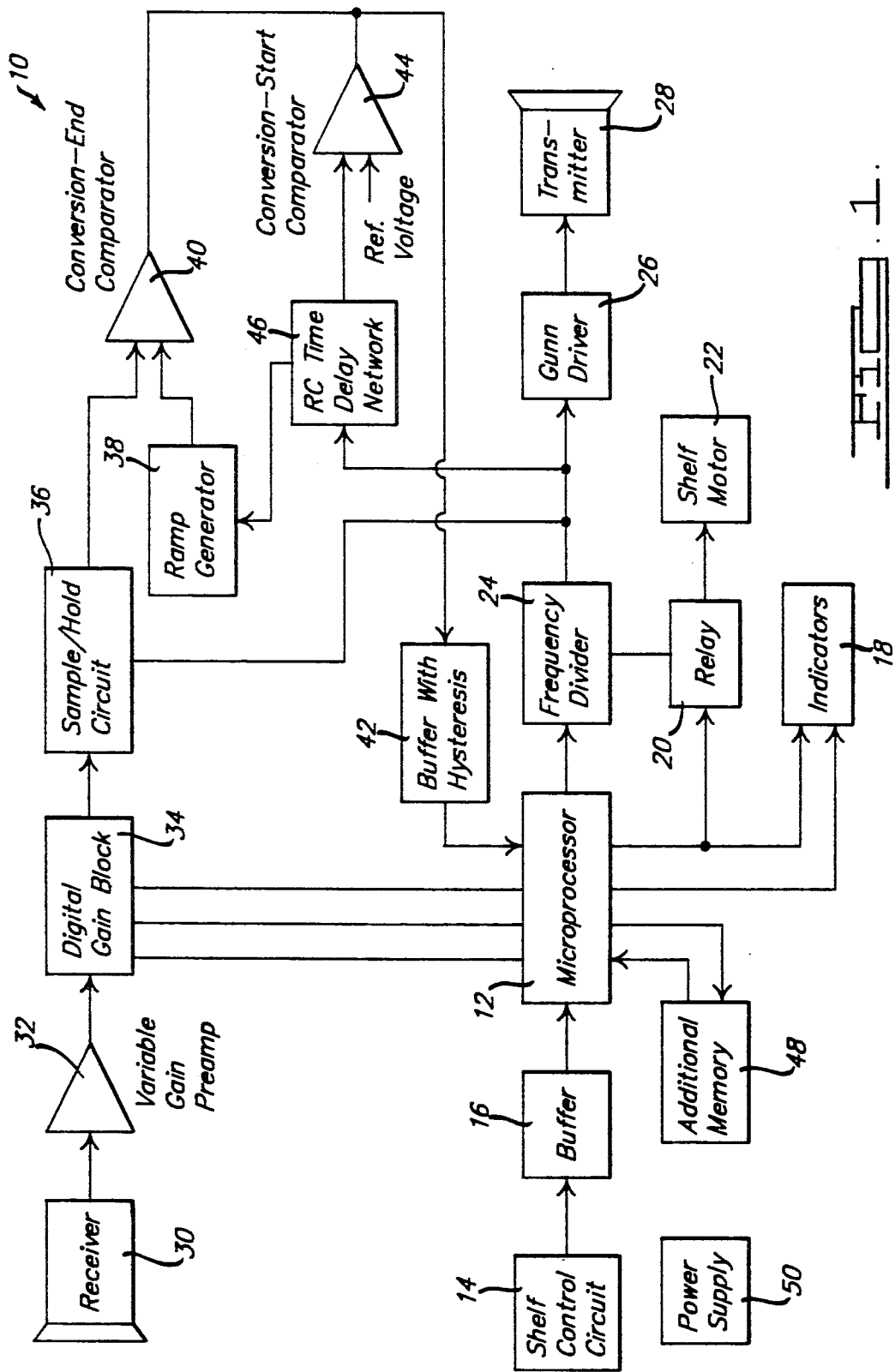
FIG. 1 is a block diagram of the field disturbance monitor system of the present invention.

FIG. 1 illustrates a block diagram of the field disturbance monitor system 10 of the present invention. At the heart of the system is a microprocessor 12 which controls the various parts of the system and determines whether there is a moving object within an area being monitored, such as an aisle. The microprocessor 12 receives operator induced control signals from a shelf control circuit 14 through a buffer 16. The microprocessor 12 controls indicators 18 which tell the operator whether there is motion in the aisle or whether motion has stopped for a predetermined period of time. The microprocessor 12 controls a relay 20 which allows the shelf motor 22 associated with the shelves to be energized. The microprocessor 12 also employs a crystal to generate a clock signal which besides timing the operations within the microprocessor 12 is processed by a frequency divider 24 to provide timing and synchronization of other components of the system. The microprocessor 12 furthermore controls the digital gain applied to the detected return signal. In addition, the microprocessor 12 utilizes memory resident software to perform programmed calculations used for conversion and comparative purposes described hereinafter. Thus, it should be appreciated that the microprocessor 12 interfaces with various circuit elements to control the active field disturbance monitor system according to the present invention.

The frequency divider 24 divides the clock signal from the microprocessor 12 down to approximately 1000 hertz. While a frequency on the order of 1,000 hertz is preferred, it should be appreciated that other frequencies may be utilized if suitable circuit components are utilized having suitable frequency response to the new frequency. This divided clock signal is utilized for all system timing. Thus, for example, this divided clock signal is supplied to a Gunn driver circuit 26 to provide a pulse-modulated microwave signal as discussed below.

The Gunn driver 26 supplies the transmitter 28 (whose active component is a solid-state X-band Gunn diode oscillator) with a square wave signal (approximately 1,000 hertz). The resulting microwave output signal is emitted from an antenna or wave guide horn radiator of the transmitter 28 with a gain of about 16 dB, which radiates the signal over the field or area where movement is to be detected. The transmitted signal is a pulse-modulated microwave signal having a center frequency of 10.525 gigahertz. This results in a pulse-modulated reflection which is easier to process than a continuous wave signal.

The reflected signal is received by a microwave receiver 30 which includes an antenna having a gain of about 16 dB and a microwave detector diode in a cavity which is tuned to accept the frequency of the transmitted signal. The detected signal is then amplified by a variable gain pre-amp 32, which includes filters to restrict amplification to the desired frequency range. The magnitude of the amplified detected signal is then amplified by the digital gain block 34 which provides binary gains of 1, 2, 4, 8, 16, 32, 64 and 128 as controlled by the microprocessor 12.

The detected and amplified return signal is then processed by a sample and hold circuit 36 which momentarily stores the voltage amplitude of the detected signal. This circuit is controlled by the clock signal from the frequency divider 24. The sample and hold circuit 36 samples the signal during transmitter high pulses and holds the voltage magnitude during transmitter low pulses.

A conversion-start comparator 44 compares an input voltage from an RC time delay network 46 with a reference voltage to start conversion a short time after frequency divider 24 goes low. The conversion-start comparator 44 signals the microprocessor 12 through the buffer 42 to initiate a timer internal to the microprocessor 12 that begins counting clock cycles after the RC time delay network 46 discharges below the reference voltage during transmitting low cycles. This begins an analog to digital conversion process.

A ramp generator 38 is also controlled by the RC time delay network 46 and provides a linearly increasing ramped voltage between transmitter pulses. A conversion-end comparator 40 compares the voltage amplitude of the detected signal from the sample and hold circuit 36 with the increasing reference voltage from the ramp generator 38. When the ramp voltage reaches the amplitude of the detected signal, the conversion-end comparator 40 sends an output signal through a buffer 42 to the microprocessor 12 to stop the timer. If the ramp voltage does not reach the amplitude of the sample during the transmitter off time the conversion-start comparator 44 terminates the conversion when frequency divider 24 goes high. The RC time delay network 46 is over-ridden by a diode on the positive transition. At this stage, the conversion process is completed and the number of clock pulses counted is a representation of the magnitude of the detected return signal. The microprocessor 12 then determines whether the measured time period is in the middle portion of the transmitter off period. If the measured time period is above a preset upper limit, the microprocessor 12 signals the digital gain control circuit 34 to decrease its gain by a factor of two. This continues on successive samples until the signal falls below the upper limit. Likewise, if the measured time period is below a preset lower limit, the gain is increased until the amplitude is in the proper range. The resulting time period is multiplied by the inverse of the gain to represent the magnitude of the sampled signal. The microprocessor 12 then processes a succession of such samples to detect variations which would indicate motion in the protected area.

Additional memory 48 is available to facilitate added capacity for other applications of the system 10. For example, the system 10 can be used to stop an automatic door from opening if a person is in its path. This application requires the system 10 to distinguish between movement of the door, which is authorized when no one is in its path, and movement of a person. Using the additional memory 48 and position encoders, the system 10 can be programmed to learn and ignore ordinary movement of the door.

The power supply 50 provides various voltage levels to the sensor circuits for biasing and other power purposes.

Turning now to FIG. 2a, the microprocessor 12 shown is manufactured by Signetics and is a type 87C51. Although this type of microprocessor is preferred, other suitable microprocessors may be used in the appropriate application. This particular microprocessor model comes equipped with an internal 64×8 RAM memory and an internal 2K×8 ROM memory. Crystal Y1, having a frequency of 7.3728 megahertz, is coupled between pins 18 and 19. Pins 16, 17, 21-24, 30 and 32-39 are coupled to the additional memory 48, which includes memory chip IC14 and address latch IC13. Address latch IC13 is controlled by the address latch enable output at pin 30 of the microprocessor 12. The memory chip IC14 is preferably a 2K×8 RAM chip, but it should be appreciated that other suitable types of memory circuits could be employed in the appropriate application. Pins 10 and 11 are coupled to a diagnosis port for testing. Pin 20 is connected to ground. Pin 40 is connected to a 5 volt DC source which is stabilized by capacitor C22. Pins 13 and 14 of microprocessor 12 receive data from door position encoders which are used in conjunction with the additional memory 48 for other applications of the system such as the above-mentioned automatic door application used. Pin 7 is coupled to the buffer IC12a, through which shelf control commands are processed. Pin 9 is coupled to a reset circuit powered by 5 volt DC power and including capacitor C25 and resistor R34.

Data bus pins 32-39 of microprocessor 12 are coupled to pins 2-9 and 11 of address latch IC13 and pins 9-11 and 13-17 of memory chip IC14. Address and control pins 16, 17 and 21-24 of the microprocessor 12 are coupled to pins 18-23 of memory chip IC14. Address latch IC13 and memory chip IC14 are coupled to each other through pins 12-19 of address latch IC13 and pins 1-8 of memory chip IC14. Pin 20 of address latch IC13 and pin 24 of memory chip IC14 are coupled to 5 volt DC power which is stabilized by capacitors C20 and C21.

Relay K1 is coupled to pin 28 of microprocessor 12 through a drive circuit employing transistor Q6 and bias resistors R24 and R25. The relay K1 includes contacts which are connected to the circuitry for the shelf motor 22. The contacts are closed when a command signal from pin 28 of microprocessor 12 energizes relay 20 by turning on transistor Q6. The closure of the contacts permit the shelf motor 22 to move a shelf so as to close an aisleway. Thus, the relay 20 provides a failsafe feature in that the contacts open when power to the sensor is lost.

There are two indicator circuits controlled by microprocessor 12 through signals transmitted from pins 27 and 28. One indicator circuit receives a signal from pin 27 of the microprocessor 12 and employs resistor R23, transistor Q5, LED1, resistor R22, and 5 volt power. This indicator circuit energizes the green LED1 when transistor Q5 conducts to visibly show that movement is currently detected. LED1 is de-energized when movement is no longer detected. The other indicator circuit receives a signal from pin 28 of the microprocessor 12 and employs buffers IC12d and e, LED2, resistor R26 and 5 volt DC power. This second indicator circuit energizes the red LED2 to visibly show that movement has been detected in the last three seconds and that the shelf is not cleared to move. In essence, LED1 and LED2 are both energized when movement is detected. The difference between the two is that LED2 will remain energized until no movement has been detected for three seconds, while LED1 is de-energized immediately when no movement is detected.

Figure 2B:
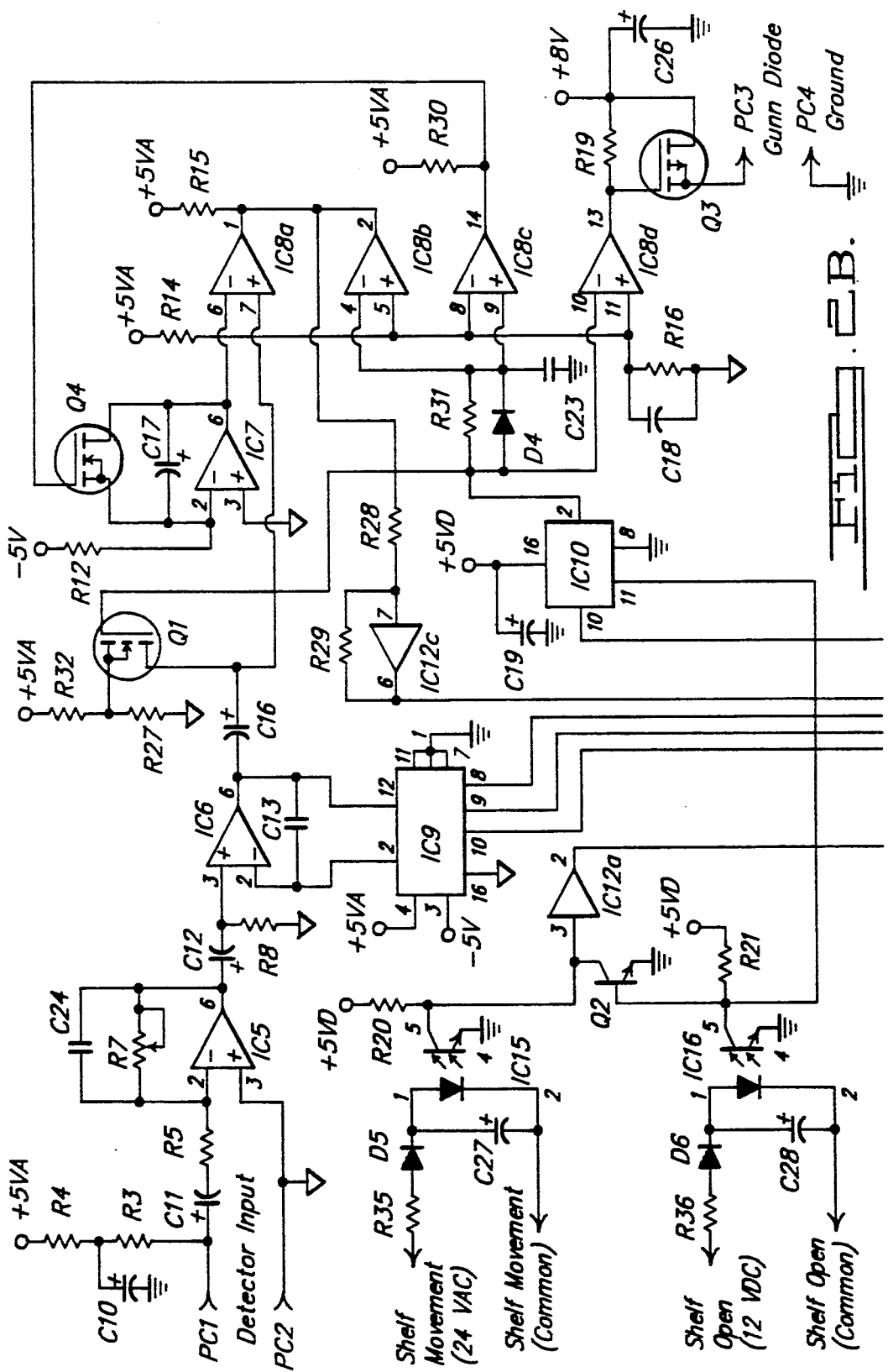
FIG. 2b is a continued schematic diagram of the field disturbance monitor system.

Turning now to FIG. 2b, the signal at pin 18 of microprocessor 12 is coupled to pin 10 of frequency divider 24 which divides the 7.3728 megahertz clock signal by 8,192 to achieve a square wave signal at pin 2 having a period of 1.111 milliseconds (i.e., a frequency of approximately 1,000 hertz) and a duty cycle of 50 percent. Pin 11 of the frequency divider circuit 24 is coupled to the shelf control circuitry 14 which deactivates the frequency divider when there is no aisle present within the detection area and when an aisle is to be created. The output signal at pin 2 of the frequency divider 24 is utilized for all system timing.

The frequency divider 24 is coupled to the Gunn driver 26 at pin 10 of comparator IC8d. Pin 11 of comparator IC8d is connected to a reference voltage derived from a 5 V power supply through a voltage divider network employing resistors R14 and R16. The voltage at pin 11 of the comparator IC8d provides a reference signal whose level depends upon the values of resistors R14 and R16. The output at pin 13 of comparator IC8d is coupled to the gate of transistor Q3 which is a p-channel field effect transistor (BUZ171). The source is coupled to an 8 volt bias source, which is stabilized by capacitor C26. The biasing circuit includes resistor R19 between the source and the gate of transistor Q3. The drain terminal of transistor Q3 is coupled to the Gunn diode of the Gunn diode oscillator within the transmitter 28.

The transmitter 28 is manufactured by Alpha Industries and has a model number GOS2572. It includes a Gunn diode oscillator and an antenna with a gain of approximately 16 dB for emitting the microwave signal. Other suitable transmitters may be used in the application.

The receiver 30 employs standard commercially available parts including a standard horn antenna and a detector diode mounted in a tuned cavity. The receiver 30 utilized in this system employs a detector diode is mounted in the X-Band cavity. The detector diode is manufactured by Alpha Industries and has a model number DDC4563A. Other suitable receivers may be used in the application. The antenna, with approximately a 16 dB gain, channels the return signal to the detector diode. The return signal travels from the detector diode terminals PC1-PC2 through a coupling network into amplifier IC5. Biasing is provided by resistors R4 and R3 and the 5 volt source. Capacitor C10 provides filtering. An RC network consisting of R5 and C11 provides further filtering of the return signal.

Variable gain pre-amp 32 employs amplifier IC5, potentiometer resistor R7 and capacitor C24. Gain is controlled and can be preset by varying the value of resistor R7.

Variable gain pre-amp 32 is coupled to pin 3 of the digital gain block 34 through a filter network employing resistor R8 and capacitor C12. The digital gain block 34 employs non-inverting amplifier IC6, capacitor C13, and a digitally programmable feedback element called a binary gain set circuit IC9. Digital gain set circuit IC9 provides binary scale gains of 1, 2, 4, 8, 16, 32, 64 and 128 as controlled by the microprocessor 12. Capacitor C13 is coupled between pins 2 and 6 of the digital gain set circuit IC9. Pins 2 and 12 of digital gain set IC9 are coupled between pins 2 and 6 of amplifier circuit IC6. Pins 8-10 of the digital gain set IC9 are coupled to pins 1-3 of microprocessor 12. In this regard, the microprocessor 12 transmits command signals to the digital gain set circuit IC9 to control selectable internal resistance between pins 2 and 12 of digital gain set circuit IC9 in binary increments.

The digital gain block 34 is coupled to the sample and hold circuit 36 through capacitor C16. Sample and hold circuit 36 includes transistor Q1, which is an n-channel field effect transistor (2N7000). Resistors R32 and R27 provide a bias voltage for the source terminal of transistor Q1. The gate terminal on transistor Q1 is coupled to the clock signal output at pin 2 of frequency divider IC10. The drain terminal of transistor Q1 is coupled to the positive terminal of capacitor C16. When the clock signal from frequency divider 24 is high (causing the transmitter 28 to emit a pulse of microwave energy), Q1 causes the positive terminal of capacitor C16 to be held to a slightly positive voltage while the negative terminal is charged to a negative voltage by amplifier IC6. When the clock signal goes low (causing the transmitter 28 to turn off), Q1 disconnects and allows the positive terminal to float. During the transmitter off period IC6 returns to a no-signal level and drives the negative terminal of capacitor C16 to near ground (0 volts). Since the positive terminal of capacitor C16 has been disconnected from the voltage divider it can now rise as much as amplifier circuit IC6 rises when returning to its no-signal level. The positive terminal now holds a voltage approximately equal to the signal excursion. Thus, it should be appreciated that the capacitor C16 samples and then retains the magnitude of the return signal (after digital gain block 34) when the transmitter has been turned off.

Pin 4 of the conversion-start comparator IC8b is coupled to pin 2 of frequency divider IC10 through an RC time delay network 46 employing resistor R31 and capacitor C23. Pin 5 is coupled to a fixed voltage reference from resistor network R14 and R16. Pin 2 of conversion-start comparator IC8b employs the same feedback path to pin 12 of microprocessor 12 as the conversion-end comparator IC8a. This common feedback path is comprised of resistors R28 and R29 and buffer IC12c. The resistors R28 and R29 provide hysteresis to buffer IC12c to steepen the rise and fall presented to the microprocessor 12. Conversion begins when the RC time delay network 46 discharges such that the voltage at pin 4 of conversion-start comparator IC8b falls below the voltage reference at pin 5.

Ramp generator 38 employs amplifier IC7, capacitor C17, transistor Q4, comparator IC8c and resistors R30 and R12. Pin 9 of comparator IC8c is coupled to pin 2 of frequency divider IC10 through diode D4. Pin 8 of comparator IC8c receives a constant voltage reference from the resistor network made up of resistors R14 and R16. The output of comparator IC8c at pin 14 is pulled up to the 5 volt supply by resistor R30 when pin 9 is higher than pin 8. The comparators of IC8 have open collector outputs and therefore need a pull up resistor. Pin 14 of comparator IC8c is coupled to the gate of transistor Q4 which is an n-channel field effect transistor (2N7000). Capacitor C17 is coupled between the source and the drain of transistor Q4, and pin 2 of amplifier IC7 is coupled to the source of transistor Q4 and to −5 volt power through resistor R12. Pin 6 of amplifier IC7 is coupled to the drain of transistor Q4. Pin 3 of amplifier IC7 is coupled to ground.

The output signals of the ramp generator 38 and the sample and hold circuit 36 are coupled to pins 6 and 7 of the conversion-end comparator IC8a respectively. The output of comparator IC8a is fed back to the microprocessor 12 through buffer 42 with hysteresis which includes resistors R28 and R29 and buffer IC12c. The output at pin 6 of buffer 42 provides a signal to microprocessor 12 for operating a timer internal to the microprocessor 12.

The shelf control circuitry 14 includes a "shelf movement" circuit and "shelf open" circuit for monitoring the shelves. The "shelf open" signals the microprocessor 12 that the shelf is open and the "shelf movement" circuit signals the microprocessor 12 that a shelf is moving. The "shelf movement" circuit is coupled to pin 7 of microprocessor 12 and employs resistors R35 and R20, diode D5, capacitor C27, opto-isolator IC15, and buffer IC12a.

The "shelf open" circuit is coupled to pin 11 of frequency divider IC10 to deactivate frequency divider IC10 when the aisle is closed. The "shelf open" circuit employs resistors R20, R21 and R36, diode D6, capacitor C28, transistor Q2 and opto-isolator IC16.

In operation, the waveform from crystal Y1 is divided by the frequency divider IC10 into an approximately 1,000 hertz square wave. The output at pin 2 of the frequency divider IC10 provides a clock signal input to comparator IC8d, which drives transistor Q3. The output from transistor Q3 controls transmitter 28, so as to provide pulsed microwave energy from the transmitter antenna to a detection zone.

The reflected signal is received by the antenna of receiver 30 which channels the signal to its microwave detector diode. The microwave detector diode superimposes the detected signal, thereby summing the phase-shifted signals, resulting in a single-pulse superposition signal. The detected signal is then filtered, and amplified by the variable gain pre-amp 32. Next, the signal is amplified by the digital gain circuit 34 as controlled by the microprocessor 12. The signal output at pin 6 of IC6 is an amplified version of the detected return signal. In this regard, the resulting signal somewhat resembles the square wave.

During transmitter on-time the transistor Q1 is clocked "on" concomitantly with transistor Q3. When transistor Q1 conducts, the positive terminal of capacitor C16 is clamped to a voltage slightly above ground. This voltage is determined by the 5 volt power supply and the voltage dividing resistors R32 and R27. This allows the negative terminal of capacitor C16 to be charged with a voltage signal equal to the magnitude of the processed return signal output of digital gain set circuit IC6.

Transistor Q4 is also turned "on" through diode D4 and comparator IC8c. As a result, capacitor C17 remains discharged. When the transmitter is off (between high clocking pulses), transistor Q1 is immediately turned off. This will cause the voltage level on the positive terminal of capacitor C16 to go positive as far as pin 6 of amplifier IC6 went negative when the transmitter was on, thereby sampling and holding the signal. At the same time, transistor Q4 continues to hold briefly until resistor R31 discharges capacitor C23 below the voltage reference set by resistors R14 and R16. At this time comparator IC8c switches and turns off transistor Q4 which allows the ramp generator 38 to function. A constant current as set by resistor R12 is applied to capacitor C17 by amplifier IC7. This causes the voltage on capacitor C17 to ramp positive linearly.

Simultaneously, the comparator IC8b switches and signals the microprocessor 12 via buffer 42 to initiate a counter within the microprocessor 12. This begins a conversion process. During conversion, the comparator IC8a compares the processed magnitude of the reflected signal with the linear ramp voltage. The microprocessor 12 counts the time required for the ramp voltage to rise to the amplitude of the reflected signal. When the ramp voltage reaches the signal voltage level on capacitor C16, comparator IC8a switches and signals the microprocessor 12 via amplifier IC12c to stop counting, thereby ending the conversion process. The time measured is a representation of the value of the reflected signal. At this point, the analog voltage signal has been converted to digital count.

Since the transmitter 12 is pulsed repetitively at a preset frequency the microprocessor 12 receives a continuous succession of samples. The microprocessor 12 subjects these samples to two recursive averaging processes. The first averaging process is a short term average that is used to filter out random noise in the system. The second averaging process is a longer term average that is used to establish a reference. If the short term average deviates from the long term average by more than a certain number, the microprocessor interprets the deviation as motion within the protected zone. Generally the amount of deviation allowed is two or three counts out of a 500 count or approximately a 0.4 percent deviation.

The microprocessor 12 controls the digital gain circuit 34 which is applied to the detected return signal to keep the magnitude of the sampled signal within the desired bounds of the measurement circuit (e.g., preferably in the middle portion of the response range). In so doing, the microprocessor 12 determines whether the measured time period is in the middle portion of the transmitter off period. If the measured time period is above a preset upper limit the microprocessor 12 signals the digital gain control circuit 34 to decrease its gain by a factor of two. This continues on successive samples until the signal falls below the upper limit. Likewise, if the measured time is below a preset lower limit the gain is increased until the amplitude is in the proper range. For purposes of the application described herein, the chosen preset upper and lower limits of the measured time period are 128 and 316 clock pulses as counted by the internal timer of microprocessor 12. However, other limits may be utilized. At the same time, the short term recursive averaging process multiplies the resulting time period by the inverse of the gain so as to compensate for any changes in measured time periods that result solely from gain changes. The result is a digital representation of the input signal which is a product of the time period and the inverse of the gain.

If there is motion in the aisle, the microprocessor 12 drives indicator LED1 via transistor Q5 and indicator LED2. Indicator LED1 is turned off when motion is no longer detected. When the aisle is quiet for 3 seconds, the microprocessor 12 drives relay K1 via transistor Q6 and de-energizes indicator LED2. The relay output, when energized, enables the shelf motor 22 to activate and move the shelf.

Figure 2C:
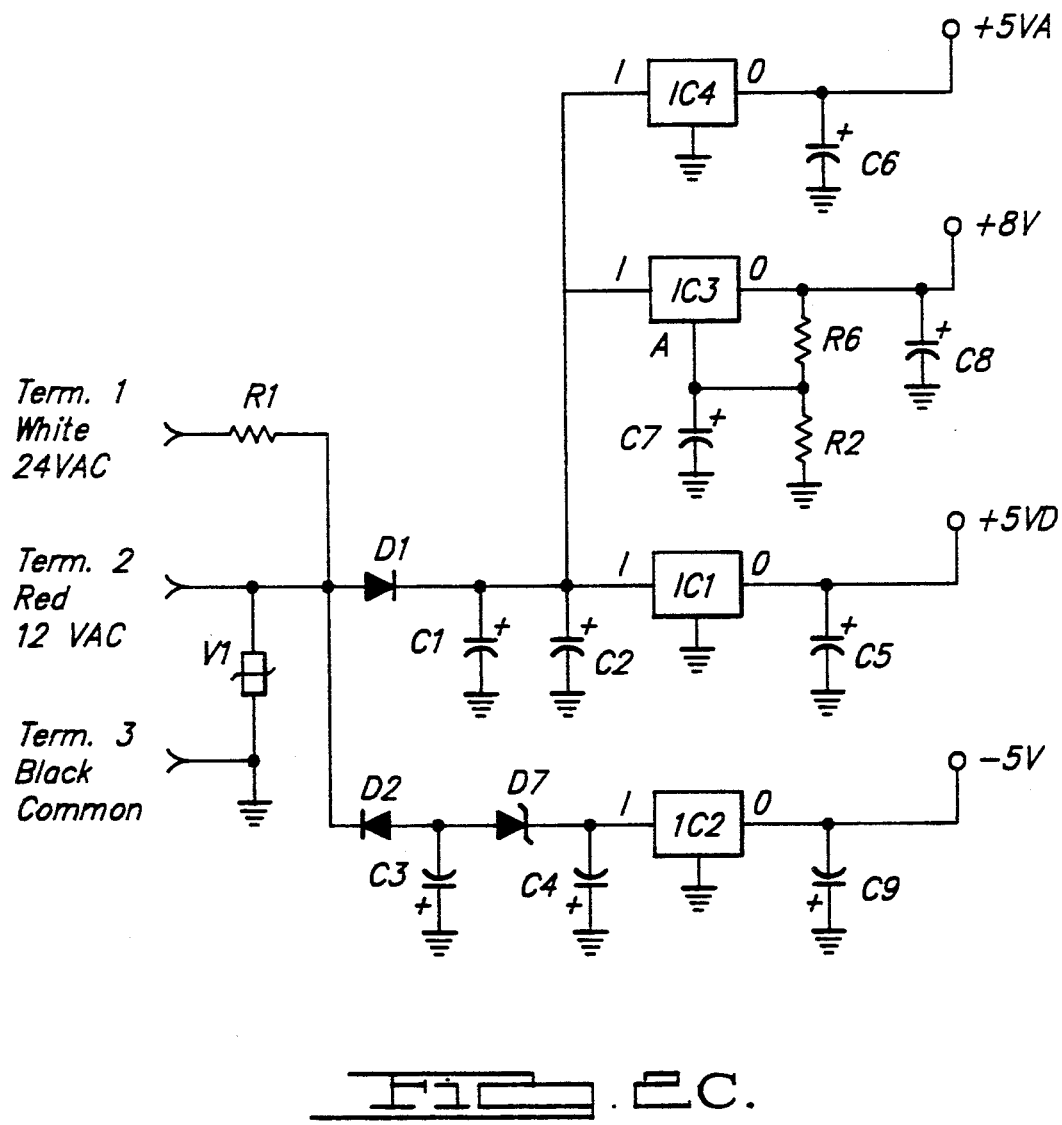
FIG. 2c is a continued schematic diagram of the field disturbance monitor system.

Turning now to FIG. 2c the power supply 50 is shown in more detail. Terminal 1 receives 24 volt AC power, terminal 2 receives 12 volt AC power and terminal 3 is a common which is coupled to ground. Over voltage protection circuit V1 provides noise immunity and over voltage suppression. Resistor R1 is a current limiting resistor.

Negative 5 volt power is supplied via a branch of the power supply 50 which employs diodes D2 and D7, capacitor C3, C4 and C9 and voltage regulator IC2.

Five volt DC power is provided by another branch of the power supply employing diode D1 and capacitor C1, C2, C5 and C6 and voltage regulator circuits IC1 and IC4.

Eight volt DC power is provided by a branch of the power supply which shares diode D1 and capacitor C1 and C2 with the 5 volt power branches but also includes voltage regulator IC3 as well as resistors R2 and R6 and capacitors C7 and C8.

FIG. 3 shows a timing diagram illustrating a reflected signal from animate objects. Changes in the magnitude of the detected signal due to movement within the field are illustrated in part A. The signal at pin 6 of IC5 shows the detected signal doubling on the third pulse due to a change in twice the magnitude of the signal detected, resulting from movement within the monitored zone. Part B illustrates the effects of applying the digital gain to the detected signal. When the amplitude of the third pulse exceeds the preset upper limit of the measurement circuit, the digital gain divides the signal by a factor of two, as shown on the fourth pulse. Part C illustrates the voltage ramp in comparison to the amplified detected signal. The microprocessor 12 measures the time it takes the ramp voltage to reach the detected signal. These corresponding measured time periods are illustrated in part D.

Figure 4A:
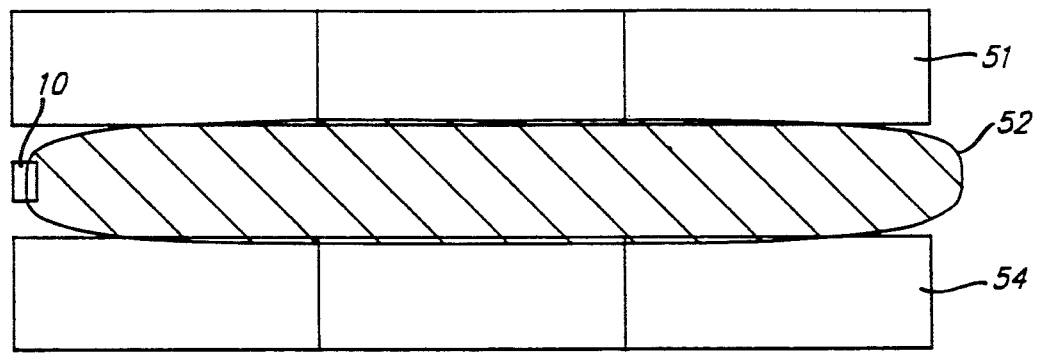
FIG. 4a is a top view of the beam pattern for the field disturbance monitor system.
Figure 4B:
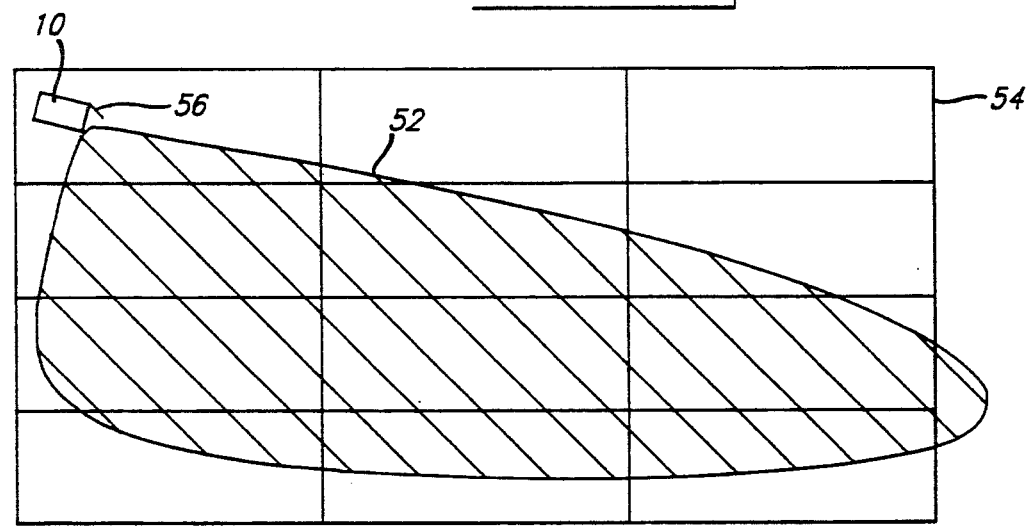
FIG. 4b is a side view for the beam pattern of the field disturbance monitor system.

Turning now to FIGS. 4a and 4b there is shown a beam pattern 52 for the field disturbance monitor system 10. The system may be mounted on a rail from the ceiling in a position midway between two shelves 54 in the open position. The beam 52 extends from one end of the shelves 54 to the other end. The length of the beam 52 may be adjusted by varying the resistance R7 in the variable gain pre-amp 32.

From the side view, the beam pattern 52 covers the aisle sufficiently to sense any animate objects in the aisle. A reflector 56 may be mounted on the system 10 (e.g., at a 118 degree angle) to direct the beam's coverage. The receiver and transmitter may be located side-by-side or located separate from each other anywhere within or around the detection field.

Turning now to FIGS. 5a–e, there are shown flowcharts for the routines and sub-routines performed by the microprocessor 12. When powered-on, the microprocessor 12 undergoes an initialization process. Initialization includes setting up all chip, timer and serial control ports, clearing on-chip random access memory (RAM) and setting the stack pointer to the top of the used area. During this time, data samples are flagged as "unknown". The relay output at pin 28 of the microprocessor 12 is turned on and the timer and all general interrupts are enabled. Finally, the timer, which counts sample interrupt periods to time how long the data has been stable, is reset.

Figure 5E:
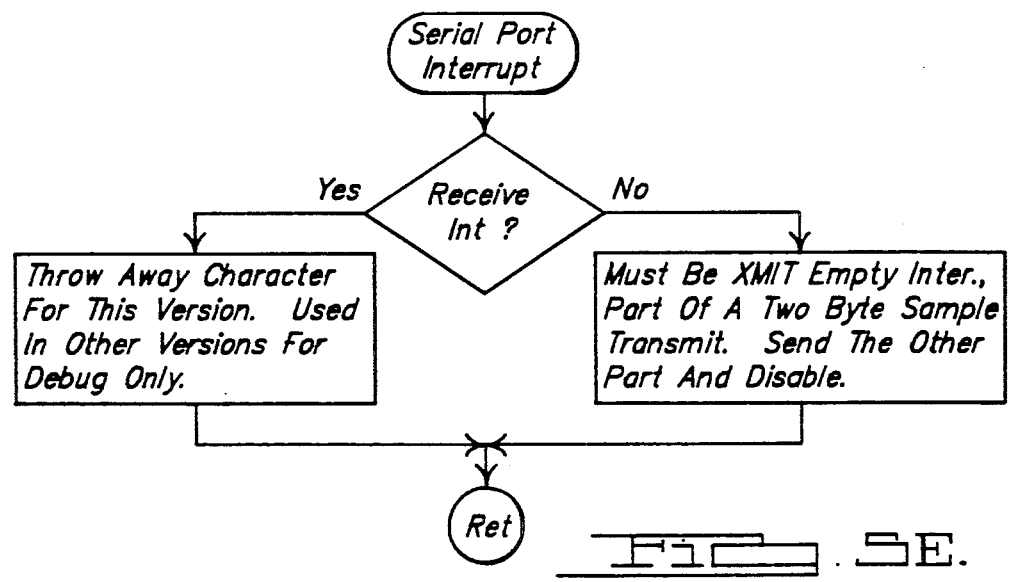
FIG. 5e is a continued flow diagram of the software for the field disturbance monitor system.
Figure 5A:
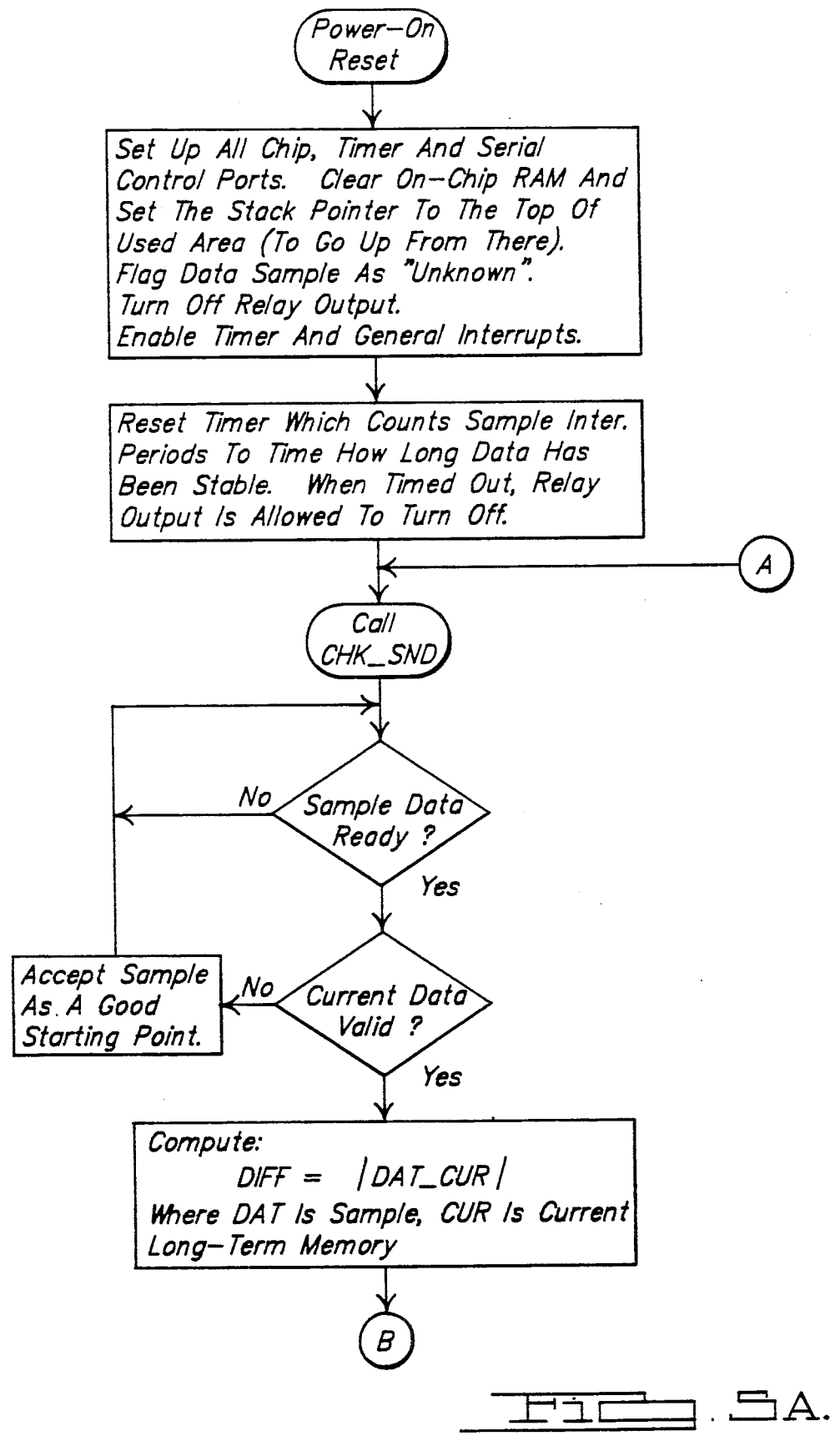
FIG. 5a is a flow diagram of the software for the field disturbance monitor system.
Figure 5B:
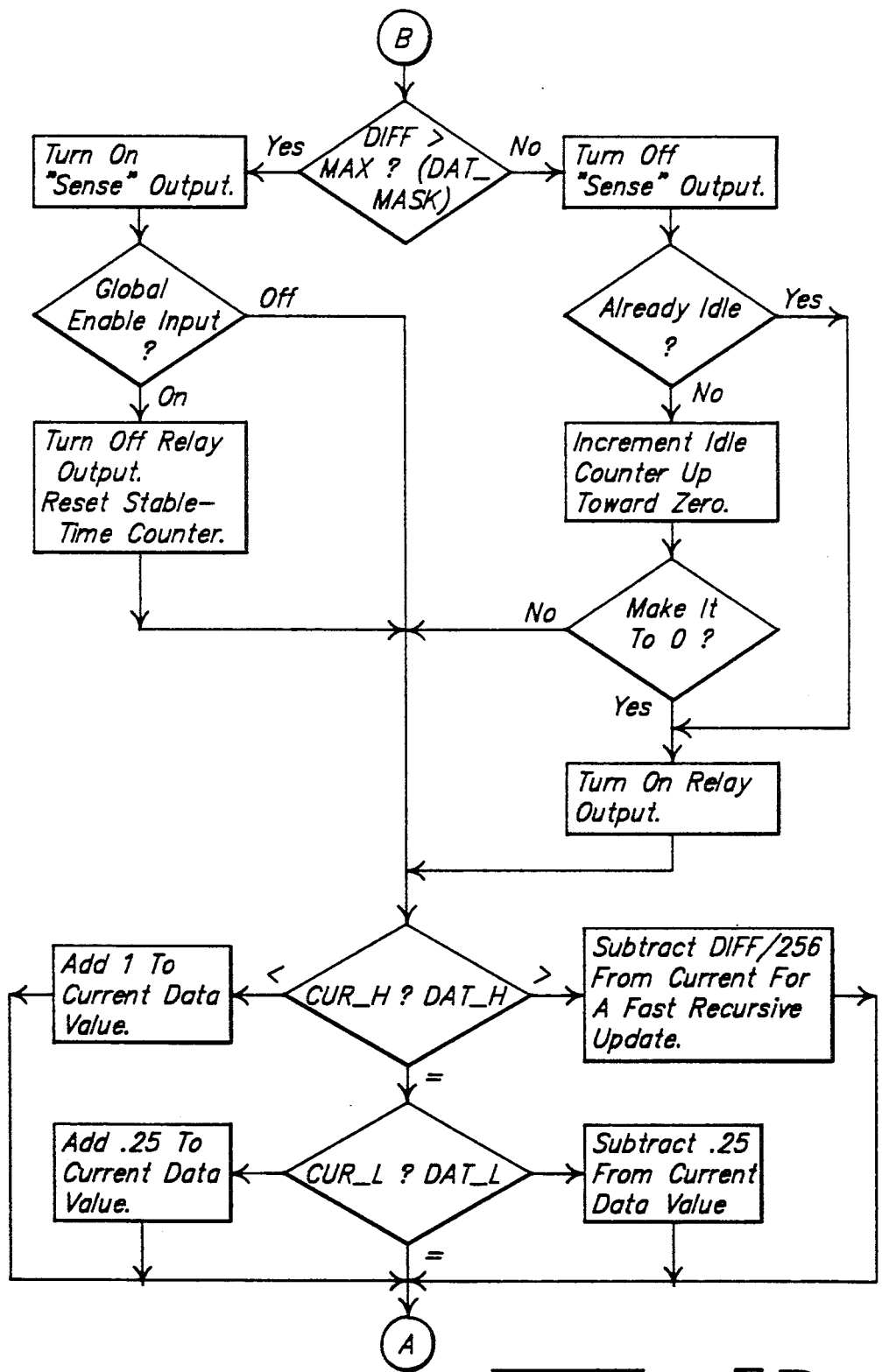
FIG. 5b is a continued flow diagram of the software for the field disturbance monitor system.

As shown in FIGS. 5a and 5b, sample data is received and compared with the current long-term memory. If the difference compared is greater than a reference value (MAX), then the relay is turned off and a stable time counter is reset. If the difference compared is less the reference value (MAX), then the relay output is turned on only after the stable time counter has timed out, thereby indicating a motionless field for certain amount of time. If the sample changes, the current long-term memory undergoes a process of adjusting to the sample value, whereby an increase of 0.25 is added to the current long-term memory for small increases and 1.0 for large increases. For decreases, 0.25 is subtracted for small decreases while a fast recursive update is available for large decreases. The current long-term memory essentially performs a recursive tracking process. This large decrease allows a system to self-adjust quickly after an aisle has been created or other changes have been made within the field.

Figure 5C:
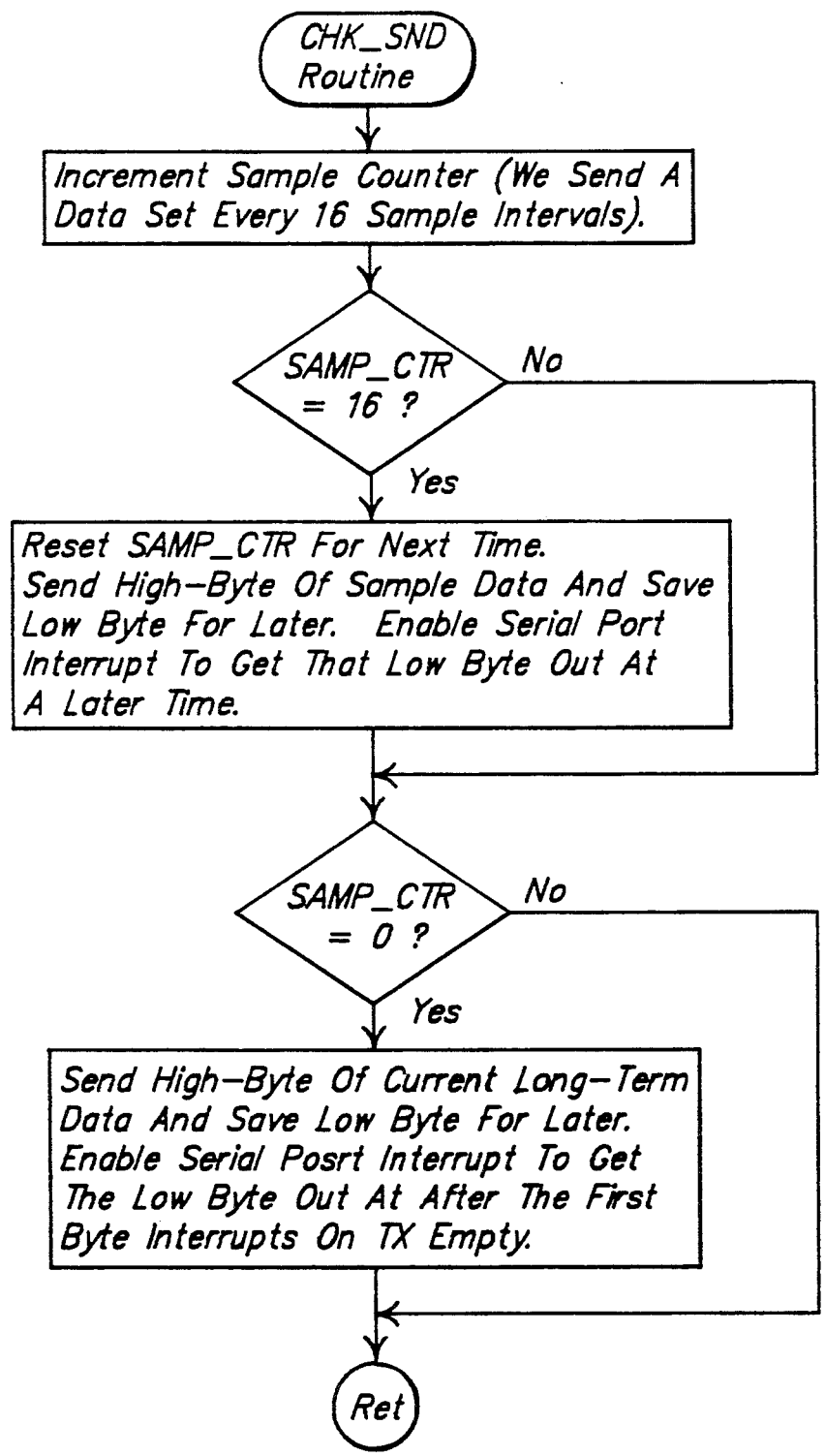
FIG. 5c is a continued flow diagram of the software for the field disturbance monitor system.

The check send (CHK-SND) routine shown in FIG. 5c is called upon to see if it is time to send a sample set out via the serial interface. The check send routine begins by incrementing the sample counter, such that a data set is sent out every 16 sample intervals. If the sample counter (SAM-CTR) equals 16 then the sample counter is reset for the next time.

Figure 5D:
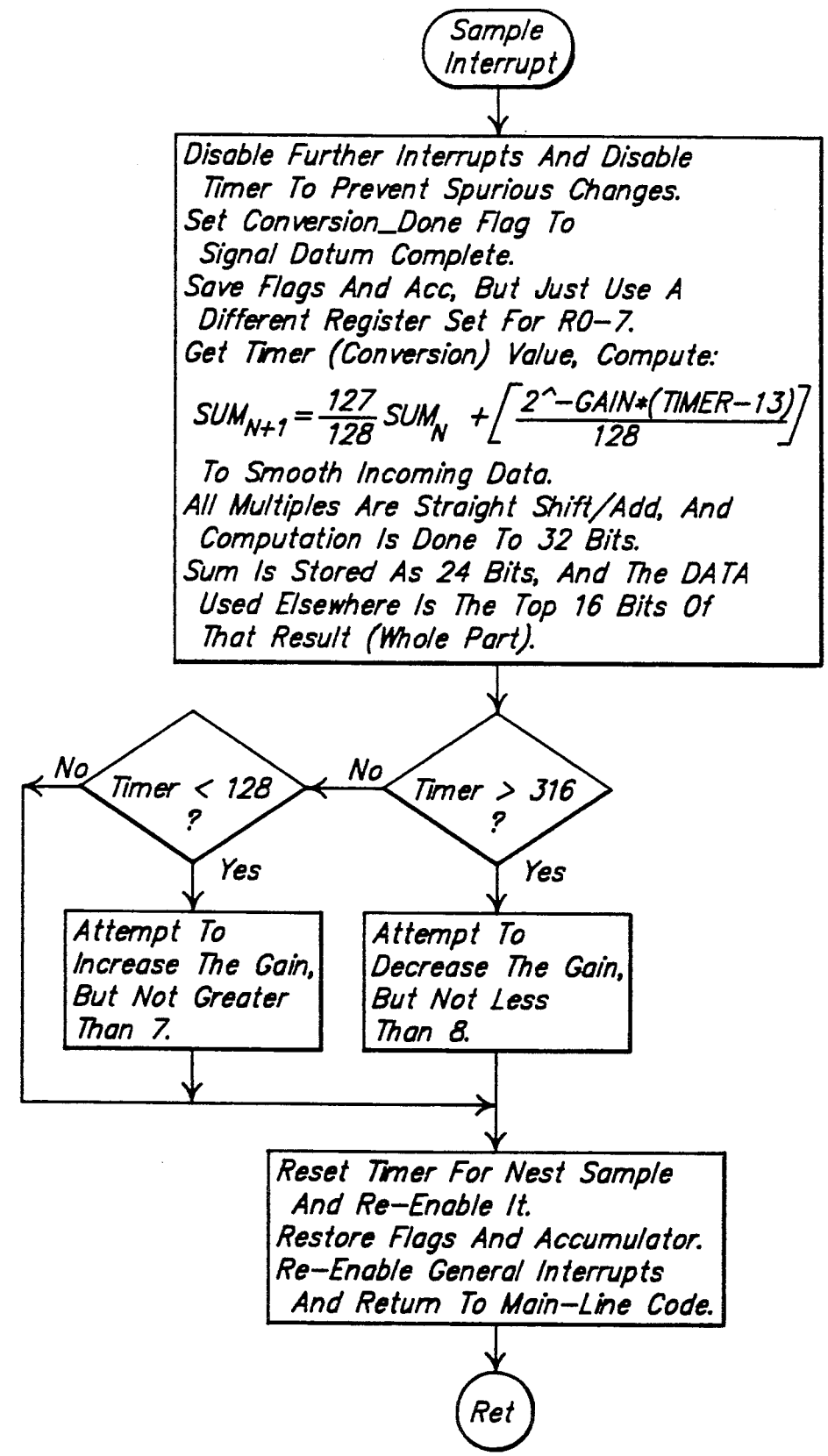
FIG. 5d is a continued flow diagram of the software for the field disturbance monitor system.

FIG. 5d shows the sample interrupt routine. This routine provides the proper adjustment on the gain and timer. When the measured time period exceeds the present upper limit (316 counts) or falls below the preset lower limit (128 counts), the gain is adjusted accordingly. In addition, the faster recursive averaging process is continuously applied.

FIG. 5e shows a serial port interrupt routine.

| Representative Element Values | | | |
|---|---|---|---|
| R1 | 5.1/5 W | C1 | 2200µ |
| R2 | 1.5K | C2 | .1µ |
| R3 | 10K | C3 | 1000µ |
| R4 | 220K | C4 | .1µ |
| R5 | 220 | C5 | 10µ |
| R6 | 270 | C6 | 10µ |
| R7 | 50K | C7 | 4.7µ |
| R8 | 10K | C8 | 1µ |
| R9 | | C9 | 10µ |
| R10 | | C10 | 33µ |
| R11 | | C11 | 10µ |
| R12 | 10K | C12 | 1µ |
| R13 | | C13 | 27 p |

-continued

| Representative Element Values | | | |
|---|---|---|---|
| R14 | 5.1K | C14 | 1μ |
| R15 | 5.1K | C15 | 1μ |
| R16 | 5.1K | C16 | 1μ |
| R17 |  | C17 | .1μ |
| R18 |  | C18 | .1μ |
| R19 | 5.1K | C19 | .1μ |
| R20 | 1K | C22 | .1μ |
| R21 | 10K | C23 | .0047 |
| R22 | 470 | C24 | .001μ |
| R23 | 100K | C25 | .47μ |
| R24 | 100K | C26 | 100μ |
| R25 | 47K | C27 | 220μ |
| R26 | 270 | C28 | 220μ |
| R27 | 1K | IC1 | 7805 |
| R28 | 1K | IC2 | 7905 |
| R29 | 10K | IC3 | LM317 |
| R30 | 5.1K | IC4 | 7805 |
| R31 | 10K | IC5, 6, 7 | NE5534 |
| R32 | 47K | IC8 | LM2901 |
| R33 |  | IC9 | LF13006N |
| R34 | 10K | IC10 | 74HC4020 |
| R35 | 10K | IC11 | 87C51 |
| R36 | 10K | IC12 | MC14050 |
| R37 | 10K | IC13 | ALS5573 |
|  |  | IC14 | 5517 |

Although the invention has been described and illustrated in connection with certain preferred embodiments there are many variations and modifications that can be effected within the spirit and scope of invention, therefore the invention as set forth in the following claims is not to be limited to the precise details of construction set forth above.

What is claimed is:

1. A system for sensing movement of an object comprising:
   (a) a means for transmitting a pulsed microwave signal;
   (b) a means for receiving a return signal which represents a reflection of the pulsed signal;
   (c) conversion means for converting the magnitude of the analog return signal to a digital representation;
   (d) a comparison means for comparing the digital representation of the return signal with the magnitude of a reference signal and for producing an output signal that indicates movement of an object;
   (e) control means including a microprocessor and digital gain circuit for adjusting the gain applied to the detected signal such that the return signal is processed within a preferred measurement bounds;
   said conversion means comprising:
   sample and hold means for sensing the return signal and holding the magnitude of the sensed signal;
   ramp means for producing a linear ramped voltage signal having an increasing magnitude;
   a first comparator coupled to the output of the sample and hold means and the ram means for comparing the magnitude of the received signal with the magnitude of the linear ramped voltage signal and for producing a first feed back signal coupled to the microprocessor for counting the time required for the linear ramped voltage to reach the magnitude of the sample signal thereby converting the return signal from an analog signal to a digital signal.

2. The system as recited in claim 1 wherein the sample and hole means comprises:
   a capacitor, coupled to transistor that provides a low voltage signal to one terminal of the capacitor when the transmitter signal is pulsed on, while the other capacitor terminal receives the voltage of the return signal, thereby charging the capacitor such that when the transmitter is pulsed off the charged voltage signal is held on the capacitor.

3. The system as recited in claim 2 further comprising a frequency divider coupled to the microprocessor for producing a pulsed control signal.

4. The system as recited in claim 3 wherein the transmitting means further comprises
   (a) driver means coupled to the frequency divider for amplifying the pulsed control signal;
   (b) means for producing an X-band microwave signal; and
   (c) means such as an antenna for emitting the pulsed microwave signal through out the field to be monitored.

5. The system as recited in claim 4 wherein the receiving means comprises:
   (a) means such as a second antenna for collecting the return microwave signal;
   (b) a detector diode for performing superposition on the detected signal so that phase shifts result in magnitude changes; and
   (c) a variable gain pre-amp coupled to the detector.

6. The system as recited in claim 5 wherein the comparison means includes programmed memory within the microprocessor for:
   (a) producing a first, recursive average of the measured time period, for filtering out random noise;
   (b) producing a second, slower recursive averaging of the measured time periods which represent the detected signal to thereby produce a reference signal;
   (c) comparing the deviation between the two signals to calculate if movement is detected.

7. The system as recited in claim 1 wherein the conversion means further comprises:
   an RC time delay for producing a slightly delayed waveform;
   a second comparator coupled to the RC time delay network for comparing the delayed waveform with a fixed reference voltage and for producing a feedback signal that signals the microprocessor to initiate conversion.

8. The system as recited in claim 7 wherein the RC time delay is further coupled to the ramp means for slightly delaying the start of the ramp signal such that the voltage held on the capacitor is able to stabilize.

9. The system as recited in claim 8 wherein the ramp means comprises:
   a second capacitor coupled between the negative input terminal and the output terminal of a comparator being coupled to the frequency divider, for providing a linear ramped voltage function while the transmitter is pulsed off.

10. The system as recited in claim 9 further comprising additional memory for storing information about moving objects.

11. The system as recited in claim 10 further comprising encoder inputs for sensing position of a moving object such as a door.

12. A method for sensing movement of an object which comprises:
   (a) transmitting a pulsed microwave signal;
   (b) receiving a return signal which represents a reflection of the pulsed signal;
   (c) sampling and storing the magnitude of the return signal with a sample/hold circuit;

(d) generating a linear ramped reference voltage signal;
(e) comparing the magnitude of the return signal with the ramped voltage signal;
(f) measuring the time required for the magnitude of the ramped voltage signal, to reach to the magnitude of the return signal;
(g) computing a first recursive averaging of the measured time period for filtering out random noise and a second slower, recursive averaging process for use as a reference signal;
(h) comparing the first average of the measured time period with the reference time period and adjusting the gain on a digital gain circuit that is applied to the return signal such that the process occurs within a preferred measurement range;
(i) controlling a system whereby a difference between the time periods indicates a change in magnitude of the return signal resulting from movement within the detection area.

* * * * *

UNITED STATES PATENT AND TRADEMARK OFFICE
CERTIFICATE OF CORRECTION

PATENT NO. : 5,150,123
DATED : September 22, 1992
INVENTOR(S) : David P. Orlowski et al It is certified that error appears in the above-identified patent and that said Letters Patent is hereby corrected as shown below:

In the Abstract, line 5, delete "pulses" and insert --pulsed--

Claim 1, column 11, line 55, delete "ram" and insert --ramp--.

Claim 2, column 11, line 64 delete "hole" and insert --hold--.

Signed and Sealed this

Thirtieth Day of November, 1993

Attest:

BRUCE LEHMAN

Attesting Officer

Commissioner of Patents and Trademarks